United States Patent
Mori et al.

(10) Patent No.: US 8,159,194 B2
(45) Date of Patent: Apr. 17, 2012

(54) CHARGING APPARATUS INCLUDING AN OPERATION INHIBITING UNIT FOR INHIBITING A BATTERY CIRCUIT BASED ON AMBIENT TEMPERATURE

(75) Inventors: Tatsuki Mori, Anjo (JP); Shinichi Hira, Anjo (JP)

(73) Assignee: Makita Corporation, Anjo-shi (JP)

( * ) Notice: Subject to any disclaimer, the term of this patent is extended or adjusted under 35 U.S.C. 154(b) by 393 days.

(21) Appl. No.: 12/385,053

(22) Filed: Mar. 30, 2009

(65) Prior Publication Data
US 2009/0251107 A1 Oct. 8, 2009

(30) Foreign Application Priority Data
Apr. 4, 2008 (JP) ................................ 2008-098283

(51) Int. Cl.
*H02J 7/16* (2006.01)
(52) U.S. Cl. ...................................................... 320/150
(58) Field of Classification Search .................... 320/150
See application file for complete search history.

(56) References Cited

U.S. PATENT DOCUMENTS

| 5,493,197 | A * | 2/1996 | Eguchi et al. ................. 320/116 |
| 5,568,039 | A * | 10/1996 | Fernandez ..................... 320/150 |
| 6,498,459 | B1 * | 12/2002 | Okumura et al. ............. 320/128 |
| 2004/0239293 | A1 * | 12/2004 | Mori et al. ..................... 320/132 |
| 2005/0110455 | A1 * | 5/2005 | Yang .............................. 320/107 |
| 2005/0225297 | A1 * | 10/2005 | Tashiro et al. ................ 320/134 |
| 2005/0242776 | A1 * | 11/2005 | Emori et al. .................. 320/116 |
| 2006/0141980 | A1 * | 6/2006 | Chung et al. ............... 455/343.1 |
| 2006/0214627 | A1 * | 9/2006 | Ito et al. ........................ 320/107 |
| 2007/0152639 | A1 * | 7/2007 | Miller .......................... 320/150 |
| 2008/0150488 | A1 * | 6/2008 | Lu et al. ....................... 320/134 |

FOREIGN PATENT DOCUMENTS
JP  A-06-153418  5/1994

* cited by examiner

*Primary Examiner* — Edward Tso
*Assistant Examiner* — Manuel Hernandez
(74) *Attorney, Agent, or Firm* — Oliff & Berridge, PLC

(57) ABSTRACT

A charging apparatus includes: a connecting unit; a charging unit; a temperature detecting unit; and an operation inhibiting unit. The connecting unit is electrically connected to a power supply portion installed inside a vehicle. The charging unit supplies at least a part of electric power supplied from the power supply portion via the connecting unit to a battery thereby to charge the battery. The operation inhibiting unit inhibits operation of a battery circuit provided in the battery when an ambient temperature detected by the temperature detecting unit has reached a preassigned designated temperature.

17 Claims, 7 Drawing Sheets

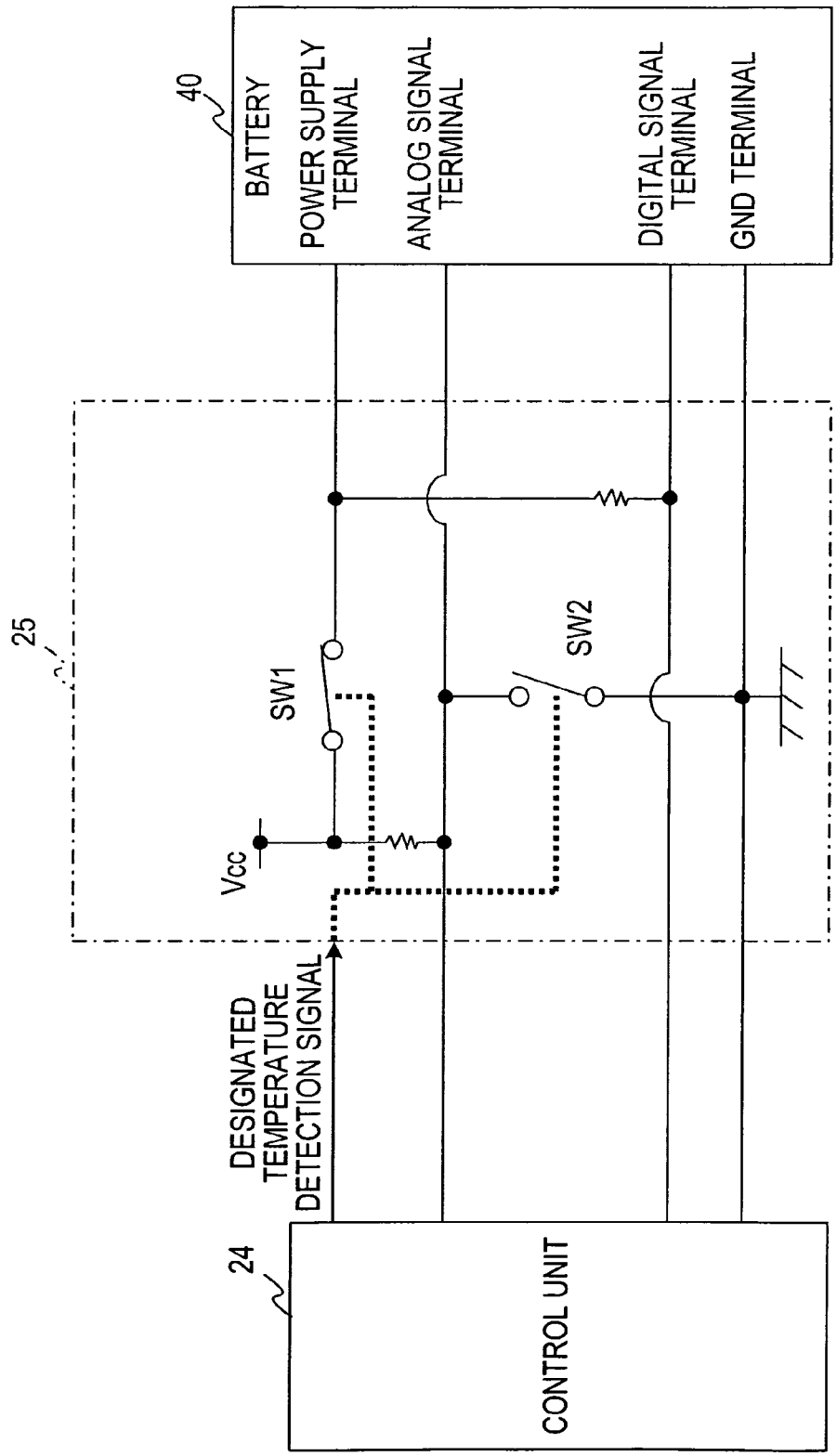

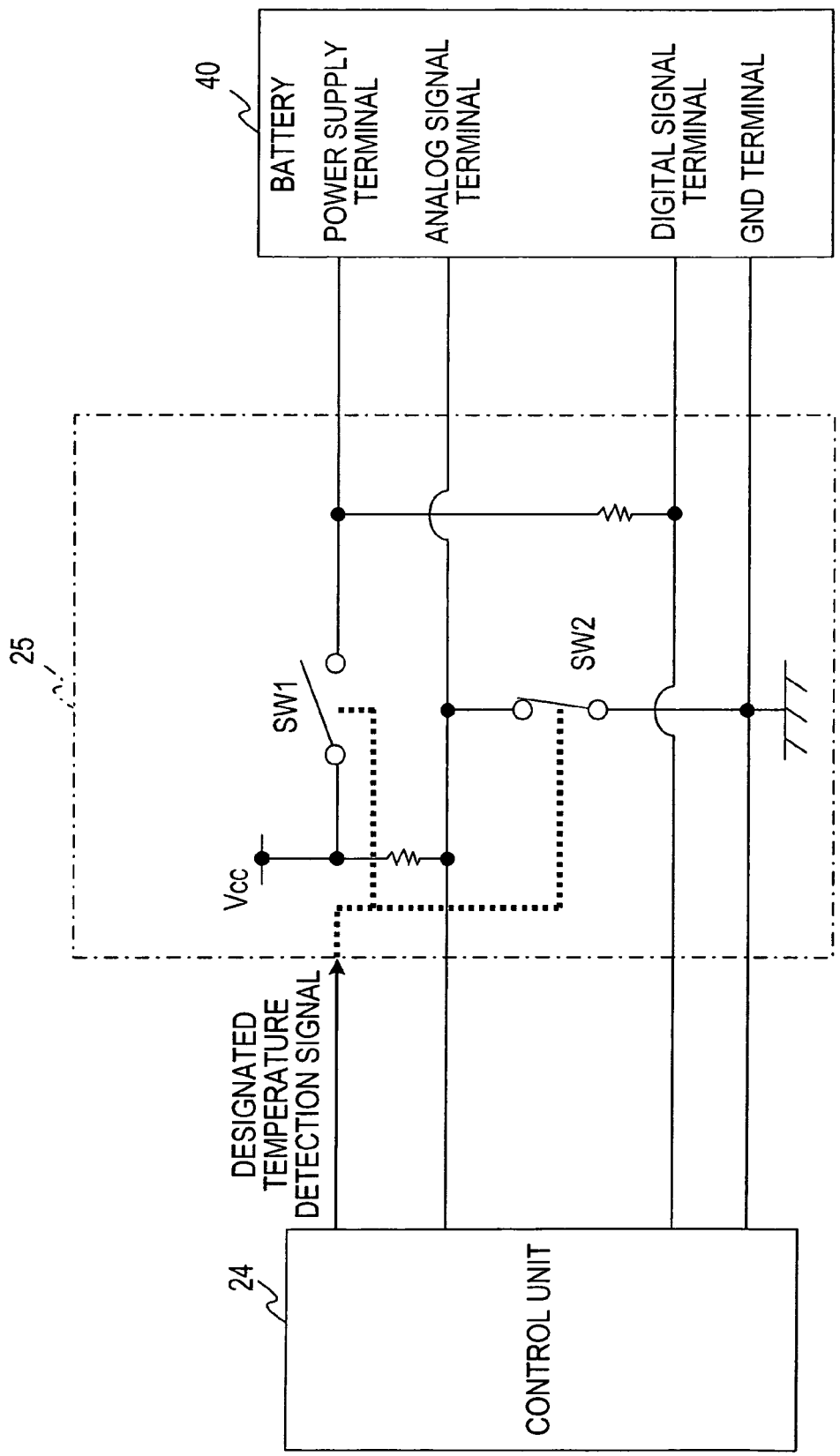

CHARGING APPARATUS INCLUDING AN OPERATION INHIBITING UNIT FOR INHIBITING A BATTERY CIRCUIT BASED ON AMBIENT TEMPERATURE

CROSS-REFERENCE TO RELATED APPLICATIONS

This application claims the benefit of Japanese Patent Application No. 2008-098283 filed Apr. 4, 2008 in the Japan Patent Office, the disclosure of which is incorporated herein by reference.

BACKGROUND

The present invention relates to a charging apparatus that charges a battery.

Some of conventional electric power tools, which include a detachable battery, are adapted to be driven by electric power supplied from the battery. In such an electric power tool, the battery is charged by a charging apparatus separately provided from the electric power tool.

One example of a charging apparatus is disclosed in Unexamined Japanese Patent Publication No. 06-153418. The charging apparatus detects a temperature of the charging apparatus and a temperature of the battery. When a predetermined time elapses in a state where an increase rate of a difference between the temperatures of the charging apparatus and the battery has reached a predetermined value, the charging apparatus determines that the battery is fully charged and stops charging the battery.

SUMMARY

Convenience of the above described electric power tool can be improved if the charging apparatus of the above example is configured to be able to receive electric power from a vehicle in order to charge the battery of the electric power tool.

The temperature inside the vehicle (especially when the vehicle is closed) can increase to extremely high temperature when the temperature outside the vehicle (external temperature) is high or when the vehicle is exposed to sunlight. If an electronic circuit (battery circuit) included in the battery is operated inside the vehicle under extremely high temperature, trouble may possibly occur to the battery circuit.

The aforementioned charging apparatus operates the battery circuit until a predetermined time elapses in a state where an increase rate of a difference between the temperatures of the charging apparatus and the battery has reached a predetermined value, even if the temperature inside the vehicle is extremely high. Thus, trouble may occur to the battery circuit when the charging apparatus is used in such an environment.

In one aspect of the present invention, it would be desirable that a charging apparatus that receives electric power from a vehicle to charge a battery suppresses causing trouble to a battery circuit by operating the battery circuit although an ambient temperature has reached a preassigned designated temperature.

A charging apparatus in a first aspect of the present invention includes a connecting unit, a charging unit, a temperature detecting unit, and an operation inhibiting unit. The connecting unit is electrically connected to a power supply portion installed inside a vehicle. The charging unit supplies at least a part of electric power supplied from the power supply portion via the connecting unit to a battery thereby to charge the battery. The temperature detecting unit detects an ambient temperature. The operation inhibiting unit inhibits operation of a battery circuit as an electronic circuit provided in the battery when the temperature detected by the temperature detecting unit has reached a preassigned designated temperature.

In the above described charging apparatus, if the ambient temperature reaches the designated temperature, the operation of the battery circuit is inhibited. Thus, it is possible to suppress causing trouble to the battery circuit by operating the battery circuit although the ambient temperature has reached the designated temperature.

The ambient temperature may include temperatures of spaces outside and inside the charging apparatus. The designated temperature can be any temperature. For example, if the designated temperature is a maximum temperature which is allowable for the battery circuit to operate or a temperature lower than the maximum temperature, the operation of the battery circuit at the maximum temperature can be inhibited.

The connecting unit may be connected to any power supply portion installed inside a vehicle. For example, the connecting unit may be configured to be electrically connected to a cigarette lighter socket provided inside the vehicle in order to supply electric power to a cigarette lighter for lighting a cigarette.

If the connecting unit is configured as such, the charging apparatus can easily obtain electric power from the cigarette lighter socket normally provided inside the vehicle.

The operation inhibiting unit may inhibit the operation of the battery circuit in any manner. For example, if the charging apparatus is provided with a power supply unit that supplies electric power to the battery circuit, the operation inhibiting unit may inhibit the operation of the battery circuit by interrupting power supply from the power supply unit to the battery circuit.

In this case, the operation of the battery circuit can be reliably inhibited by interrupting power supply to the battery circuit.

The battery may be provided with at least one power supply terminal for electrically connecting the battery to the power supply unit and supplying electric power supplied from the power supply unit to the battery circuit. In this case, the operation inhibiting unit may inhibit the operation of the battery circuit by interrupting electrical connection between the power supply unit and the at least one power supply terminal.

The charging apparatus may include an electric signal communicating unit that communicates electric signals with the battery circuit, and the battery may be provided with at least one connecting terminal for electrically connecting the electric signal communicating unit and the battery circuit. In this case, it is preferable that the operation inhibiting unit sets a potential of the at least one connecting terminal to a protective potential by which the battery circuit can be electrically protected, when inhibiting the operation of the battery circuit.

In the operation inhibiting unit configured as above, even when a voltage generated by any cause is applied to the at least one connecting terminal in a state where the battery circuit is not operated, it is possible to suppress causing trouble to the battery circuit by the applied voltage.

In this case, it is preferable that the operation inhibiting unit includes an inhibition signal outputting unit, an interrupting unit, and a protective potential setting unit.

In the operation inhibiting unit configured as such, the inhibition signal outputting unit outputs an inhibition signal that inhibits the operation of the battery circuit when inhibiting the operation of the battery circuit. When the inhibition signal is outputted from the inhibition signal outputting unit, the interrupting unit interrupts electrical connection between the power supply unit and the at least one power supply terminal. When the electrical connection between the power supply unit and the at least one power supply terminal is interrupted by the interrupting unit, the protective potential setting unit sets a potential of the at least one connecting terminal to a protective potential.

In this case, power supply to the battery circuit can be interrupted and the potential of the at least one connecting terminal can be set to the protective potential, in synchronization with the output of the inhibition signal. In other words, as compared to the case in which the interruption of power supply to the battery circuit is not synchronized with the setting of the potential of the at least one connecting terminal to the protective potential, the battery circuit can be efficiently protected.

The protective potential may be any potential as long as the battery circuit can be electrically protected by the potential. For example, it is preferable that the protective potential is a reference potential of the battery circuit.

In this case, even if a voltage generated by any cause is applied to the at least one connecting terminal, a current generated by the voltage does not flow into the battery circuit. The battery circuit can be reliably protected.

The charging apparatus may be provided with a battery attaching portion that detachably attaches the battery to the charging apparatus. Also, the battery can be used in any apparatus. For example, the battery may be used in an electric power tool.

A recording medium in a second aspect of the present invention can be read by a computer which is provided in a charging apparatus including: a temperature detecting unit that detects an ambient temperature; and a charging unit that charges a battery, and stores a program that causes the computer to execute a detection value obtaining step and an operation determining step.

When the recording medium is read by the computer and this program is executed by the above described computer, the computer obtains a detection value of the ambient temperature from the temperature detecting unit in the detection value obtaining step, and determines whether or not the detection value obtained in the detection value obtaining step has reached a preassigned designated temperature in the operation determination step. When the detection value has not reached the designated temperature, the computer permits operation of the battery circuit as an electronic circuit provided in the battery, while, when the detection value has reached the designated temperature, the computer inhibits the operation of the battery circuit.

In other words, according to the recording medium that stores such a program, the computer can function as the operation inhibiting unit in the charging apparatus of the first aspect of the present invention.

The computer may inhibit the operation of the battery circuit in any manner in the aforementioned operation determination step. For example, the computer may inhibit the operation of the battery circuit by outputting an inhibition signal which inhibits the operation of the battery circuit.

The above described computer may be a known computer or a computer suitably configured for the charging apparatus of the first aspect of the present invention.

Also, the aforementioned recording medium may be of any type as long as the recording medium is readable by a computer. Such recording medium includes, for example, any types of semiconductor elements (e.g., ROM, RAM, EEPROM, flash memory) that can store a program, a flexible disk (FD), an optical disk (MO), a DVD, a CD-ROM, a Blu-Ray disk, a HD-DVD, a hard disk, a USB memory, a memory card, etc.

BRIEF DESCRIPTION OF THE DRAWINGS

An embodiment of the present invention will now be described by way of example with reference to the accompanying drawings, in which:

FIG. 6 is an explanatory view simply illustrating operation of the control unit and the operation control circuit when an ambient temperature is lower than a designated temperature; and FIG. 7 is an explanatory view simply illustrating the operation of the control unit and the operation control circuit when the ambient temperature has reached the designated temperature.

DETAILED DESCRIPTION OF THE PREFERRED EMBODIMENTS

Figure 1:
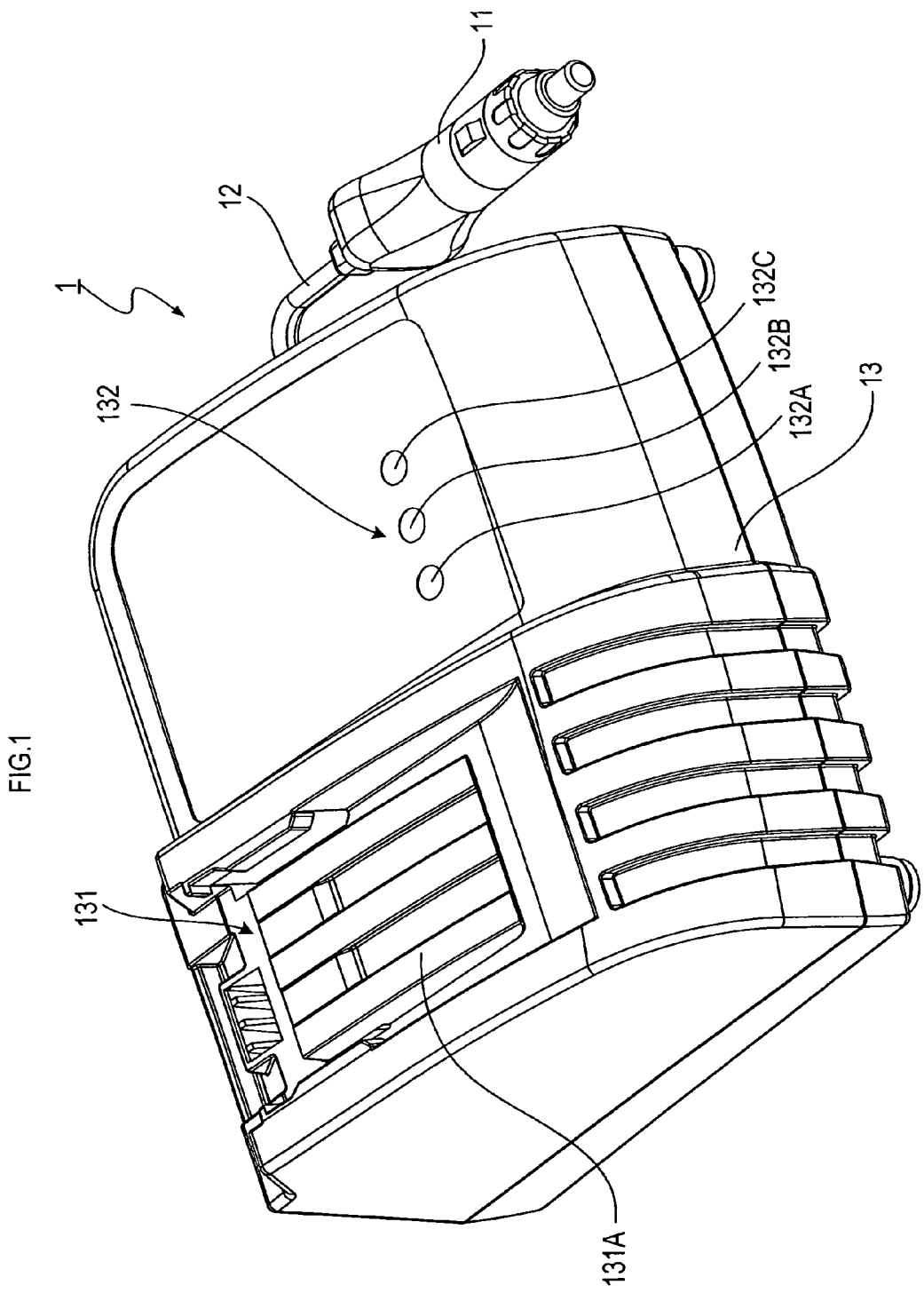
FIG. 1 is a perspective view showing a front side appearance of a charging apparatus according to the present invention.

As shown in FIG. 1, a charging apparatus 1 of the present invention includes a cigarette lighter plug (hereinafter, simply referred to as a plug) 11, a power supply cord 12, and a main body 13.

The plug 11 is designed to be received by a cigarette lighter socket (hereinafter, simply referred to as a socket) 30 provided in a vehicle (see FIG. 3) in order to supply electric power to a not shown cigarette lighter for lighting a cigarette. The plug 11 is electrically connected to the socket 30 when received by the socket 30.

The power supply cord 12 is electrically connected to the plug 11 at one end and to the main body 13 at the other end. The power supply cord 12 transmits electric power supplied from the socket 30 via the plug 11 to the main body 13 when the plug 11 is electrically connected to the socket 30. The socket 30 is electrically connected to a not shown battery mounted on the vehicle. Electric power of the vehicle battery (for example, direct current (DC) 12V or 24V) is supplied via the socket 30 to the plug 11.

The main body 13 includes an attachment portion 131 and a display portion 132. The attachment portion 131 is configured such that a battery 40 (see FIG. 3) of an electric power tool can be attached to or detached from the main body 13 in a sliding manner.

Figure 2:
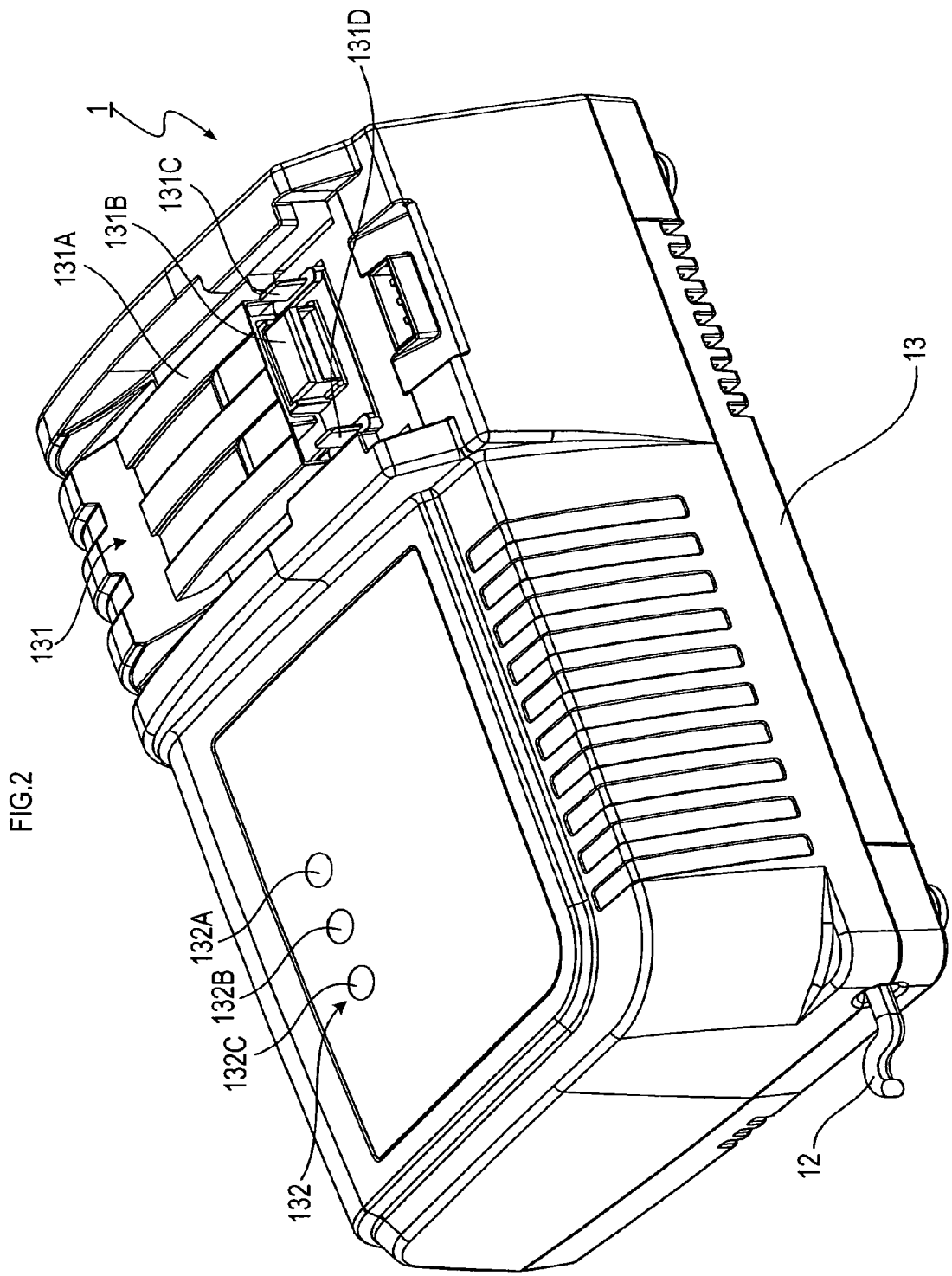
FIG. 2 is a perspective view showing a back side appearance of the charging apparatus.

More particularly, as shown in FIG. 2, the attachment portion 131 includes a protection cover 131A, a connector 131B, and a pair of charging terminals 131C and 131D.

The protection cover 131A is slidably provided with the attachment portion 131 so as to cover the connector 131B and the charging terminals 131C and 131D when the battery 40 is not attached to the attachment portion 131, and to expose the connector 131B and the charging terminals 131C and 131D to the battery 40 when the battery 40 is attached to the attachment portion 131.

The connector 131B includes: at least one output terminal (not shown) for supplying electric power to a battery circuit 42 (see FIG. 3) which is an electronic circuit provided in the battery 40; a plurality of input terminals (not shown) for receiving signals from the battery circuit 42; and a reference potential terminal for setting a reference potential of the battery circuit 42.

The charging terminals 131C and 131D are electrically connected to a cell 41 (see FIG. 3) provided in the battery 40 when the battery 40 is attached to the attachment portion 131 and supply electric power to the cell 41.

The display portion 132 includes three LEDs 132A, 132B and 132C which display a charged state and others of the battery 40 attached to the main body 13. In FIG. 2, depiction of the plug 11 is omitted.

Figure 3:
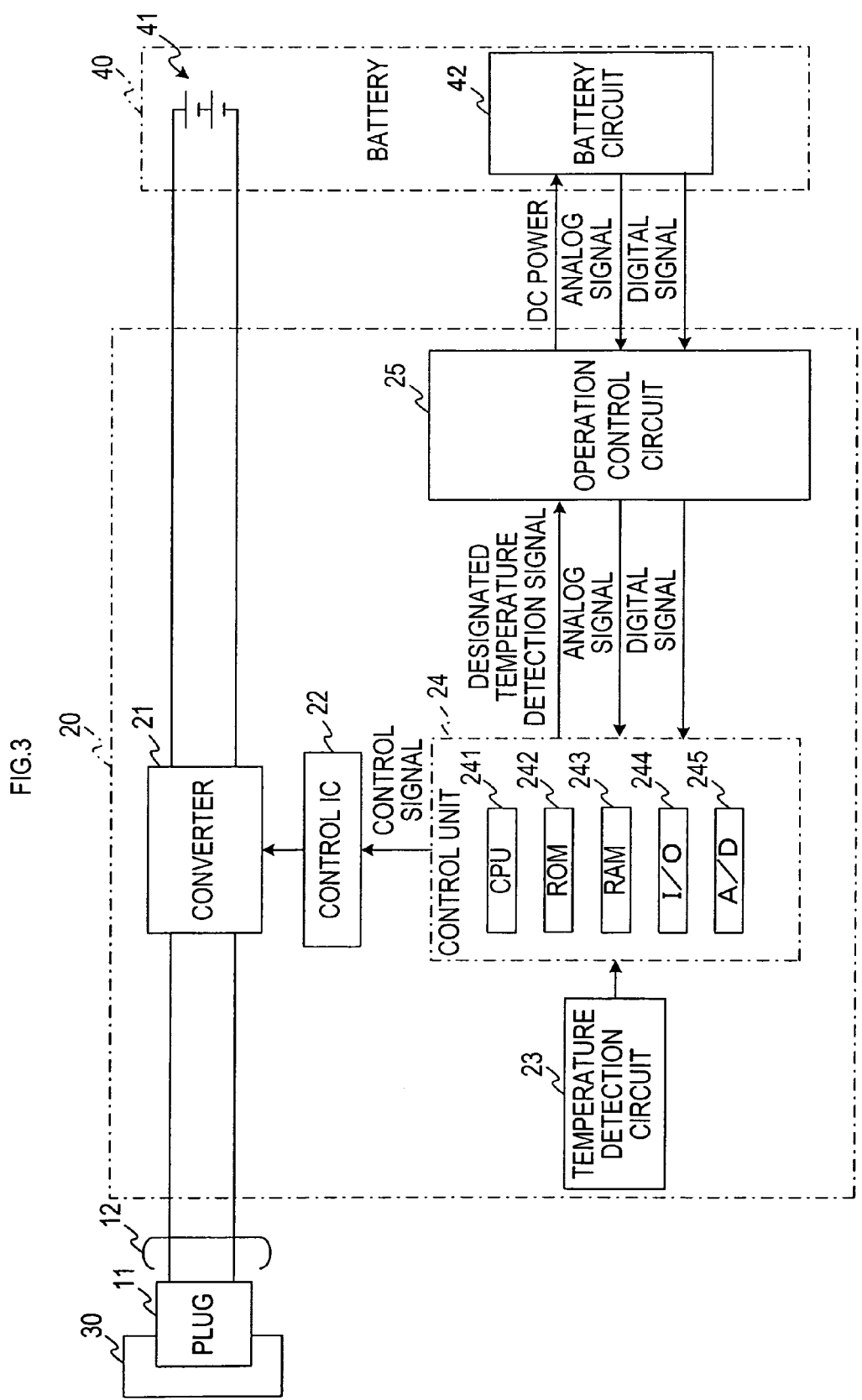
FIG. 3 is a block diagram of a charging circuit provided in a main body of the charging apparatus.

Referring to FIG. 3, a charging circuit 20 provided in the main body 13 includes a converter 21, a control IC 22, a temperature detection circuit 23, a control unit 24, and an operation control circuit 25.

The converter 21 is electrically connected to the plug 11 via the power supply cord 12 at its input stage and to a cell 41 inside the battery 40 attached to the main body 13 at its output stage. The converter 21 is a so-called DC-DC converter which converts a DC power supplied from the socket 30 via the plug 11 into a DC power adapted to charge the cell 41 of the battery 40. The battery 40 is charged by supplying the converted DC power (charging current) to the cell 41.

The control IC 22 controls operation of the converter 21 (for example, ON/OFF and others of the charging current) based on a control signal outputted from the control unit 24.

The temperature detection circuit 23 detects an ambient temperature around the temperature detection circuit 23, more particularly, an internal temperature of the main body 13, thereby to output a temperature detection signal indicating the detected temperature to the control unit 24.

The control unit 24 of the present embodiment is a known microcomputer including at least a CPU 241, a ROM 242, a RAM 243, an input/output (I/O) port 244 and an analog/digital (A/D) converter 245. In the control unit 24, the CPU 241 executes various processes according to various programs stored in the ROM 242 thereby to control respective portions of the charging circuit 20. In the control unit 24, analog signals inputted to an input port of the I/O port 244 are converted to digital values by the A/D converter 245. The converted digital values are read by the CPU 241.

The operation control circuit 25 controls operation of the battery circuit 42 provided in the battery 40, based on a designated temperature detection signal outputted from the control unit 24. More particularly, the operation control circuit 25 turns ON/OFF power supply to the battery circuit 42. The operation control circuit 25 also outputs analog signals and digital signals outputted from the battery circuit 42 to the control unit 24.

Figure 4:
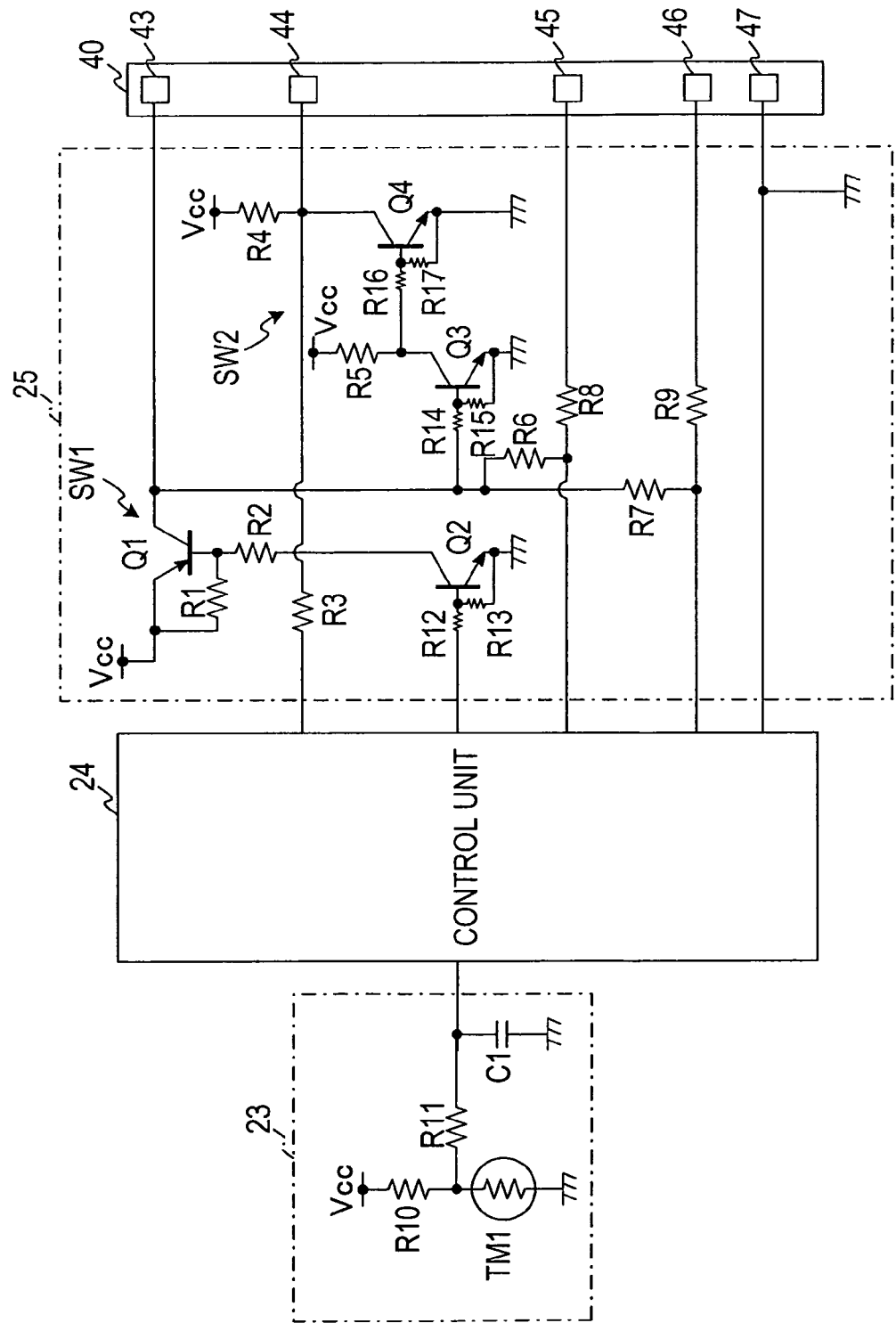
FIG. 4 is a circuit diagram showing details of a temperature detection circuit and an operation control circuit included in the charging circuit.

FIG. 4 shows details of the temperature detection circuit 23 and the operation control circuit 25. As shown in FIG. 4, the temperature detection circuit 23 includes a thermistor TM1, resistors R10 and R11, and a capacitor C1.

The thermistor TM1 is a resistor which changes its resistance value depending on an ambient temperature around the thermistor TM1. The thermistor TM1 of the present embodiment is a resistor which decreases its resistance value as the ambient temperature around the thermistor TM1 is increased.

The thermistor TM1 may be a resistor which increases its resistance value as the ambient temperature around the thermistor TM1 is increased.

The thermistor TM1 is connected to a DC power source Vcc of the charging circuit 20 via the resistor R10 at one end, and to a GND line which is set to a reference potential (GND) of the charging circuit 20 at the other end. The DC power source Vcc of the present embodiment is constituted by a DC-DC converter which converts a DC power supplied from the socket 30 via the plug 11 into a DC power suitable for the charging circuit 20.

The resistor R11 is connected to between the thermistor TM1 and the resistor R10 at one end, and to the I/O port 244 (more particularly, to the input port) of the control unit 24 at the other end.

The capacitor C1 is connected to the other end of the resistor R11 at one end, and to the GND line at the other end. That is, the capacitor C1 and the resistor R11 forms a low pass filter which removes electrical noise having high frequency.

In the temperature detection circuit 23 configured as above, voltage of the DC power source Vcc is divided by the resistor R10 and the thermistor TM1. The divided voltage is outputted to the control unit 24 as the aforementioned temperature detection signal in analog form. In the temperature detection circuit 23 of the present embodiment, the thermistor TM1 has the aforementioned characteristics. Thus, when the ambient temperature around the temperature detection circuit 23 is increased, the voltage of the temperature detection signal is decreased, while the ambient temperature around the temperature detection circuit 23 is decreased, the voltage of the temperature detection signal is increased.

The operation control circuit 25 includes switch circuits SW1 and SW2.

The switch circuit SW1 includes transistors Q1 and Q2 and resistors R1, R2, R12 and R13.

The transistor Q1 is a PNP bipolar transistor. The DC power source Vcc is connected to an emitter of the transistor Q1. A power supply terminal 43 provided in the battery 40 is connected to a collector of the transistor Q1. The power supply terminal 43 is a terminal for supplying DC power of the DC power source Vcc to the battery circuit 42. The emitter of the transistor Q1 is connected to a base of the transistor Q1 via the resistor R1.

The transistor Q2 is a NPN bipolar transistor. The GND line is connected to an emitter of the transistor Q2. The base of the transistor Q1 is connected to a collector of the transistor Q2 via the resistor R2. The emitter of the transistor Q2 is connected to a base of the transistor Q2 via the resistor R13. The I/O port 244 (more particularly, the output port) of the control unit 24 is connected to the base of the transistor Q2 via the resistor R12. From the output port, the aforementioned designated temperature detection signal is outputted. The designated temperature detection signal of the present embodiment is a binary voltage signal by which a logic level of voltage is set to either "High" (for example, DC 5V) or "Low" (for example DC 0V).

In the switch circuit SW1 configured as above, when the logic level of the designated temperature detection signal is set to "High", electric current flows between the base and the emitter of the transistor Q2 thereby to turn ON the transistor Q2. When the transistor Q2 is turned ON, electric current flows between the emitter and the base of the transistor Q1 thereby to turn ON the transistor Q1. Thus, the DC power source Vcc and the power supply terminal 43 are electrically connected. DC power of the DC power source Vcc is then supplied to the battery circuit 42 via the power supply terminal 43.

On the other hand, when the logic level of the designated temperature detection signal is set to "Low", electric current flowing between the base and the emitter of the transistor Q2 is interrupted thereby to turn OFF the transistor Q2. When the transistor Q2 is turned OFF, electric current flowing between the emitter and the base of the transistor Q1 is interrupted thereby to turn OFF the transistor Q1. Thus, the DC power source Vcc and the power supply terminal 43 are electrically disconnected.

The switch circuit SW2 includes transistors Q3 and Q4 and resistors R3, R4, R5, R6, R7, R8, R9, R14, R15, R16 and R17.

The transistor Q3 is a NPN bipolar transistor. The GND line is connected to an emitter of the transistor Q3. The DC power source Vcc is connected to a collector of the transistor Q3 via the resistor R5.

The collector of the transistor Q1 is connected to a base of the transistor Q3 via the resistor R14. The emitter of the transistor Q3 is connected to the base of the transistor Q3 via the resistor R15.

The transistor Q4 is a NPN bipolar transistor. The GND line is connected to an emitter of the transistor Q4. The DC power source Vcc is connected to a collector of the transistor Q4 via the resistor R4.

The collector of the transistor Q3 is connected to a base of the transistor Q4 via the resistor R16. The emitter of the transistor Q4 is connected to the base of the transistor Q4 via the resistor R17.

The resistor R3 is connected to the I/O port 244 (more particularly, the input port) of the control unit 24 at one end, and to the collector of the transistor Q4 and to an analog signal terminal 44 provided in the battery 40 at the other end. The analog signal terminal 44 is a terminal for outputting analog signals outputted from the battery circuit 42 to the control unit 24.

The resistor R8 is connected to the I/O port 244 (more particularly, the input port) of the control unit 24 at one end, and to a digital signal terminal 45 provided in the battery 40 at the other end. The digital signal terminal 45 is a terminal for outputting digital signals outputted from the battery circuit 42 to the control unit 24. The resistor R8 is also connected to the collector of the transistor Q1 via the resistor R6 at the one end.

The resistor R9 is connected to the I/O port 244 (more particularly, the input port) of the control unit 24 at one end, and to another digital signal terminal 46 provided in the battery 40 at the other end. The digital signal terminal 46 is a terminal for outputting another digital signals outputted from the battery circuit 42 to the control unit 24. The resistor R9 is also connected to the collector of the transistor Q1 via the resistor R7 at the one end.

In the switch circuit SW2 configured as above, when the transistor Q1 of the switch circuit SW1 is turned ON, electric current flows between the base and the emitter of the transistor Q3 thereby to turn ON the transistor Q3. When the transistor Q3 is turned ON, electric current flowing between the base and the emitter of the transistor Q4 is interrupted thereby to turn OFF the transistor Q4. As a result, the potential of the analog signal terminal 44 is pulled up to the potential of the DC power source Vcc via the resistor R4.

Also, when the transistor Q1 of the switch circuit SW1 is turned ON, the potential of the digital signal terminal 45 is pulled up to the potential of the DC power source Vcc via the resistors R6 and R8. The potential of the digital signal terminal 46 is also pulled up to the potential of the DC power source Vcc via the resistors R7 and R9.

On the other hand, when the transistor Q1 of the switch circuit SW1 is turned OFF, electric current flowing between the base and the emitter of the transistor Q3 is interrupted thereby to turn OFF the transistor Q3. When the transistor Q3 is turned OFF, electric current flows between the base and the emitter of the transistor Q4 thereby to turn ON the transistor Q4. As a result, the potential of the analog signal terminal 44 is set to the GND.

Also, when the transistor Q1 of the switch circuit SW1 is turned OFF, the potential of the digital signal terminal 45 is set to the GND via the resistors R6, R8, R14 and R15. The potential of the digital signal terminal 46 is also set to the GND via the resistors R7, R9, R14 and R15.

The battery 40 of the present embodiment is provided with a GND terminal 47 for setting a reference potential of the battery circuit 42. The GND terminal 47 is connected to the GND line of the charging circuit 20. In other words, the reference potential of the battery circuit 42 is set to the GND of the charging circuit 20. The reference potential of the control unit 24 is also set to the GND of the charging circuit 20.

Hereinafter, a battery circuit protection process executed by the control unit 24 (more particularly, by the CPU 241) will be explained. The control unit 24 is activated, and executes the present process, when the plug 11 is connected to the socket 30 and electric power is supplied to the charging apparatus 1.

Figure 5:
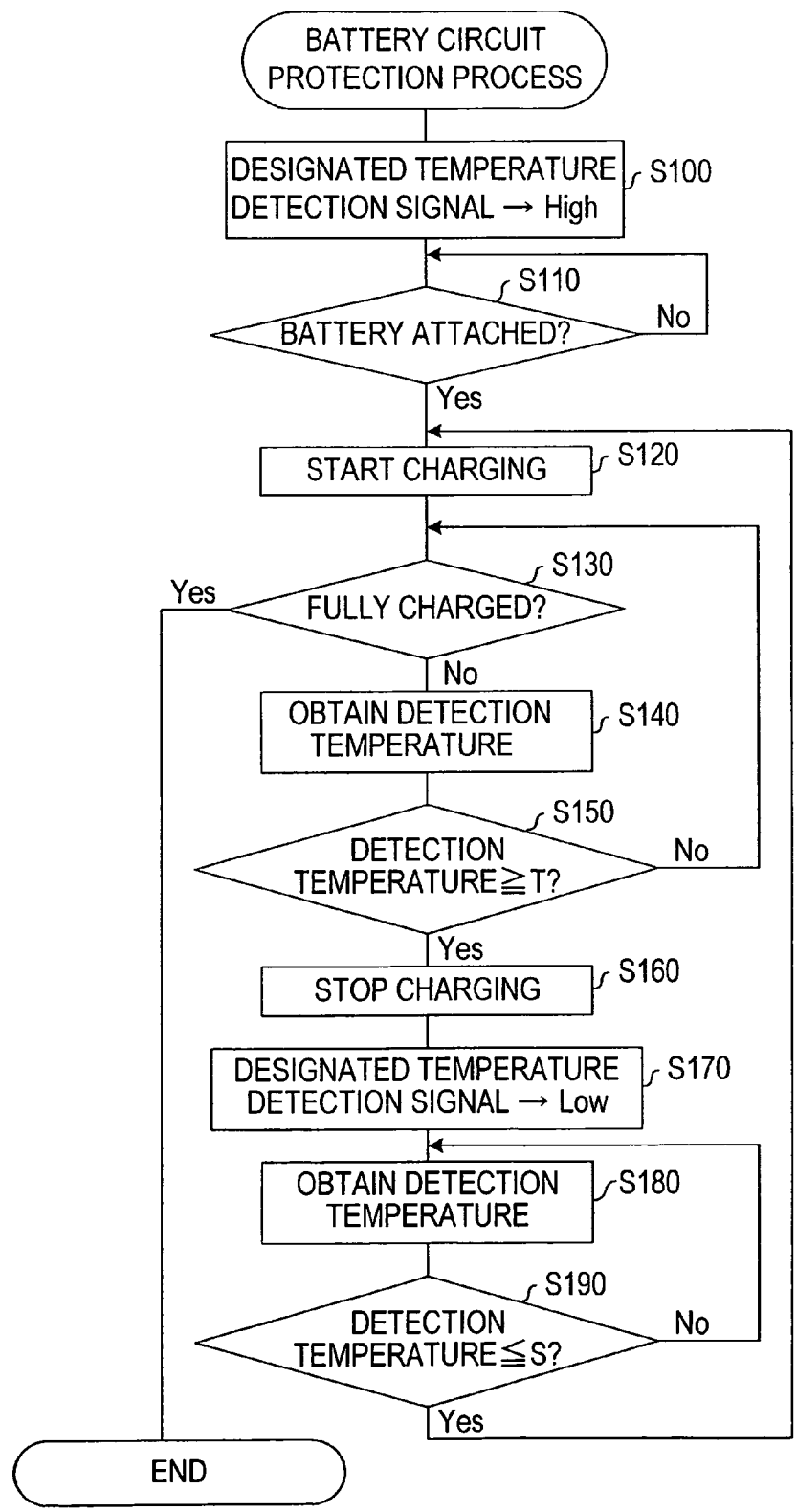
FIG. 5 is a flowchart showing a flow of a battery circuit protection process executed by a control unit included in the charging circuit.

As shown in FIG. 5, in the present process, after the logic level of the designated temperature detection signal is firstly set to "High" (S100), attachment of the battery 40 to the main body 13 is awaited (S110: No). In S110, whether or not the battery 40 is attached to the main body 13 is determined by determining whether or not a signal indicating that the battery 40 has been attached to the main body 13 is supplied from the battery circuit 42. In the present embodiment, the signal indicating the attachment of the battery 40 is supplied from the battery circuit 42 to the control unit 24 via the analog signal terminal 44 and the digital signal terminal 45.

When it is determined that the battery 40 has been attached to the main body 13 (S110: Yes), a command to start charging is sent to the control IC 22 so that charging current is outputted from the converter 21 to the battery 40, thereby to start charging the battery 40 (S120).

It is then determined, based on a signal supplied from the battery circuit 42, whether or not the battery 40 is fully charged (S130). When it is determined that the battery 40 is not fully charged (S130: No), the voltage value of the temperature detection signal (detection temperature) supplied from the temperature detection circuit 23 is obtained (S140). It is then determined whether or not the obtained detection temperature is a preassigned designated temperature T or higher (S150). In the present embodiment, a maximum temperature which is allowable for the battery circuit 42 to operate (for example, 80° C.) or a temperature lower than the maximum temperature is set as the designated temperature T.

When it is determined that the detection temperature is lower than the designated temperature T (S150: No), the present process returns to S130.

On the other hand, if it is determined that the detection temperature is the designated temperature T or higher (S150: Yes), a command to stop charging is sent to the control IC 22 so that the charging current from the converter 21 to the battery 40 is stopped, thereby to stop charging the battery 40 (S160). Subsequently, the logic level of the designated temperature detection signal is set to "Low" (S170) to turn OFF the transistor Q1 of the switch circuit SW1. As a result, power supply to the battery circuit 42 is interrupted and the operation of the battery circuit 42 is inhibited.

Subsequently, in the same manner as in S140, the detection temperature is obtained (S180). It is then determined whether or not the obtained detection temperature is a preset threshold temperature S or lower (S190). The threshold temperature S of the present embodiment is set to be a temperature lower than the designated temperature T by a predetermined hysteresis preset temperature a (for example, 5° C.).

When it is determined that the detection temperature is higher than the threshold temperature S (S190: No), the process returns to S180. When it is determined that the detection temperature is the threshold temperature S or lower (S190: Yes), the process returns to S120.

In S130, if it is determined the battery 40 is fully charged (S130: Yes), the present process is ended.

That is, as shown in FIG. 6, in the charging circuit 20, when the ambient temperature is lower than the designated temperature T, the logic level of the designated temperature detection signal is set to "High". As a result, the DC power source Vcc and the power supply terminal 43 are electrically connected via the switch circuit SW1. Thereby, electric power is supplied to the battery circuit 42 and the battery circuit 42 is operated.

On the other hand, as shown in FIG. 7, when the ambient temperature has reached the designated temperature T, the logic level of the designated temperature detection signal is set to "Low". As a result, the switch circuit SW1 electrically disconnects the DC power source Vcc and the power supply terminal 43. Thereby, power supply to the battery circuit 42 is interrupted and the operation of the battery circuit 42 is inhibited. Also, by the switch circuit SW2, the potentials of the analog signal terminal 44 and the digital signal terminals 45 and 46 are set to the GND.

As noted above, in the charging apparatus 1 of the present embodiment, when the ambient temperature has reached the maximum temperature which is allowable for the battery circuit 42 to operate, the operation of the battery circuit 42 is inhibited. Thus, it is possible to suppress causing trouble to the battery circuit 42 by operating the battery circuit 42 although the ambient temperature has reached the designated temperature.

Also, the charging apparatus 1 of the present embodiment is configured to be electrically connected to the cigarette lighter socket. Thus, electric power can be easily obtained from the cigarette lighter socket normally provided inside the vehicle.

In the charging apparatus 1 of the present embodiment, by interrupting power supply to the battery circuit 42, the operation of the battery circuit 42 can be reliably inhibited.

Also in the charging apparatus 1 of the present embodiment, when the operation of the battery circuit 42 is inhibited, the potentials of the analog signal terminal 44 and the digital signal terminals 45 and 46 provided in the battery 40 are set to the GND. Therefore, even if a voltage generated by any cause is applied to either of the terminals, the current generated by the voltage does not flow into the battery circuit 42. The battery circuit 42 can be reliably protected.

In the charging apparatus 1 of the present embodiment, power supply to the battery circuit 42 is interrupted and the potentials of the aforementioned terminals are set to the GND, in synchronization with setting of the logic level of the designated temperature detection signal to "Low". Therefore, as compared to a case in which interruption of power supply to the battery circuit 42 and setting of the potentials of the aforementioned terminals to the GND are performed asynchronously, the battery circuit 42 can be efficiently protected.

Although one embodiment of the present invention has been described above, it is to be understood that the present invention should not be limited to the above embodiment, but may be embodied in various forms within the technical scope of the present invention.

For example, in the above embodiment, electric power is supplied from the DC power source Vcc to the battery circuit 42. However, electric power may be supplied to the battery circuit 42 via the converter 21. In this case, the operation of the battery circuit 42 may be inhibited by electrically disconnecting the converter 21 and the battery circuit 42.

In the above described embodiment, the battery 40 is a battery for use in electric power tools. However, the battery 40 can be a battery used for apparatus other than electric power tools.

Also, while the program of the battery circuit protection process is prestored in the ROM 242 of the control unit 24 in the above described embodiment, the program of the battery circuit protection process may be stored in other storage (for example, in a backup RAM) to be loaded from the other storage to the control unit 24 (particularly, the CPU 241), or may be loaded via a network to the control unit 24, for use.

Also, the aforementioned program may be recorded in recording media which can be read by the control unit 24. Such recording media include, for example, a flexible disk (FD), an optical disk (MO), a DVD, a CD-ROM, a Blu-Ray disk, a HD-DVD, a hard disk, a USB memory, a memory card, etc.

While the charging apparatus 1 is configured to charge the battery 40 detached from the electric power tool in the above described embodiment, the charging apparatus 1 may be configured to charge a battery fixed to the electric power tool. In this case, the electric power tool itself may be electrically connected to the charging apparatus 1.

In the above described embodiment, when the operation of the battery circuit 42 is inhibited, the potentials of the analog signal terminal 44 and the digital signal terminals 45 and 46 are set to the GND. However, the potentials may be set to a potential other than the GND as long as the battery circuit 42 can be electrically protected by that potential. For example, in case that the battery circuit 42 needs to be protected from reverse voltage, the potentials of the aforementioned terminals may be set to the potential of the DC power source Vcc.

While the temperature detection circuit 23 is provided inside the main body 13 in the above described embodiment, the temperature detection circuit 23 may be provided outside the main body 13.

In the above described battery circuit protection process, the logic level of the designated temperature detection signal is set to "High" in the first step (S100). However, the step of obtaining the detection temperature may be executed before the first step. When the obtained detection temperature is the designated temperature T or higher, the logic level of the designated temperature detection signal may be set to "Low" (that is, the logic level of the designated temperature detection signal does not need to be set to "High").

While the battery 40 is provided with one power supply terminal 43 in the above described embodiment, the battery 40 may be provided with a plurality of power supply terminals 43.

In the above described embodiment, when the ambient temperature is lower than the designated temperature T, the logic level of the designated temperature detection signal is set to "High", while, when the ambient temperature has reached the designated temperature T, the logic level of the designated temperature detection signal is set to "Low". However, when the ambient temperature is lower than the designated temperature T, the logic level of the designated temperature detection signal may be set to "Low", while, when the ambient temperature has reached the designated temperature T, the logic level of the designated temperature detection signal may be set to "High". In this case, however, the switch circuit SW1 may be configured such that, when the logic level of the designated temperature detection signal is "Low", the DC power source Vcc and the power supply terminal 43 are electrically connected, while, when the logic level of the designated temperature detection signal is "High", the DC power source Vcc and the power supply terminal 43 are electrically disconnected.

In the present embodiment, the control unit 24 is a microcomputer. However, the control unit 24 may be an electronic circuit other than a microcomputer, for example, an ASIC (Application Specific Integrated Circuit), a programmable logic device (for example, FPGA) and others.

What is claimed is:

1. A charging apparatus, comprising:
    a connecting unit that is electrically connected to a power supply portion installed inside a vehicle;
    a charging unit that supplies at least a part of electric power supplied from the power supply portion via the connecting unit to a battery thereby to charge the battery;
    a temperature detecting unit that detects an ambient temperature; and
    an operation inhibiting unit that inhibits operation of a battery circuit as an electronic circuit provided in the battery when the temperature detected by the temperature detecting unit has reached a preassigned designated temperature.

2. The charging apparatus according to claim 1, wherein the designated temperature is set as a maximum temperature which is allowable for the battery circuit to operate.

3. The charging apparatus according to claim 1, wherein the designated temperature is set as a temperature lower than a maximum temperature which is allowable for the battery circuit to operate.

4. The charging apparatus according to claim 1, wherein the connecting unit is configured to be electrically connected to a cigarette lighter socket which is provided inside the vehicle in order to supply electric power to a cigarette lighter for lighting a cigarette.

5. The charging apparatus according to claim 1, further comprising
    a power supply unit that supplies electric power to the battery circuit, wherein
    the operation inhibiting unit inhibits the operation of the battery circuit by interrupting power supply from the power supply unit to the battery circuit.

6. The charging apparatus according to claim 5, wherein the battery is provided with at least one power supply terminal for electrically connecting the battery to the power supply unit and supplying electric power supplied from the power supply unit to the battery circuit, and
    the operation inhibiting unit inhibits the operation of the battery circuit by interrupting electrical connection between the power supply unit and the at least one power supply terminal.

7. The charging apparatus according to claim 6, further comprising
    an electric signal communicating unit that communicates electric signals with the battery circuit, wherein
    the battery is provided with at least one connecting terminal for electrically connecting the electric signal communicating unit and the battery circuit, and
    the operation inhibiting unit sets a potential of the at least one connecting terminal to a protective potential by which the battery circuit can be electrically protected, when inhibiting the operation of the battery circuit.

8. The charging apparatus according to claim 7, wherein the operation inhibiting unit includes
    an inhibition signal outputting unit that outputs an inhibition signal that inhibits the operation of the battery circuit when inhibiting the operation of the battery circuit;
    an interrupting unit that, when the inhibition signal is outputted from the inhibition signal outputting unit, interrupts electrical connection between the power supply unit and the at least one power supply terminal; and
    a protective potential setting unit that, when the electrical connection between the power supply unit and the at least one power supply terminal is interrupted by the interrupting unit, sets a potential of the at least one connecting terminal to the protective potential.

9. The charging apparatus according to claim 8, wherein the protective potential is a reference potential of the battery circuit.

10. The charging apparatus according to claim 7, wherein the protective potential is a reference potential of the battery circuit.

11. The charging apparatus according to claim 1, further comprising
    a battery attaching portion that detachably attaches the battery to the charging apparatus.

12. The charging apparatus according to claim 1, wherein the battery is used in an electric power tool.

13. The charging apparatus according to claim 1, further comprising:
    a charging stopping unit that stops charging the battery by the charging unit when the temperature detected by the temperature detecting unit has reached the designated temperature; and
    a charging restarting unit that restarts charging the battery by the charging unit when the temperature detected by the temperature detecting unit has reached a threshold temperature lower than the designated temperature by a predetermined preset hysteresis temperature after the charging stopping unit stops charging the battery.

14. The charging apparatus according to claim 1,
    wherein the charging unit supplies the at least a part of electric power to the battery via a first connecting terminal;
    the charging apparatus further comprising a power supply unit that supplies electric power to the battery circuit via a second connecting terminal that is distinct from the first connecting terminal.

15. A recording medium that can be read by a computer which is provided in a charging apparatus including: a temperature detecting unit that detects an ambient temperature; and a charging unit that charges a battery, and that stores a program that causes the computer to execute:
    a detection value obtaining step of obtaining a detection value of the ambient temperature from the temperature detecting unit; and
    an operation determining step of determining whether or not the detection value obtained in the detection value obtaining step has reached a preassigned designated temperature and, when the detection value has not reached the designated temperature, permitting operation of the battery circuit as an electronic circuit provided in the battery, while, when the detection value has reached the designated temperature, inhibiting the operation of the battery circuit.

16. The recording medium according to claim 15, wherein,
the operation determining step includes outputting an inhibition signal which inhibits the operation of the battery circuit, when the operation of the battery circuit is inhibited.

17. The recording medium according to claim 15,
wherein the program causes the computer to further execute:

a charging stopping step of stopping charging the battery by the charging unit when the detection value obtained in the detection value obtaining step has reached the designated temperature; and a charging restarting step of restarting charging the battery by the charging unit when the detection value obtained in the detection value obtaining step has reached a threshold temperature lower than the designated temperature by a predetermined preset hysteresis temperature after the charging of the battery by the charging unit is stopped in the charging stopping step.

* * * * *